United States Patent
Bazin et al.

(10) Patent No.: US 7,697,425 B2
(45) Date of Patent: Apr. 13, 2010

(54) METHOD TO PROVIDE MULTICAST DATA TRANSMISSION IN A DISCONTINUOUS NETWORK

(75) Inventors: Claire Bazin, Paris (FR); Herve Maillard, Igny (FR)

(73) Assignee: ALCATEL, Paris (FR)

( * ) Notice: Subject to any disclaimer, the term of this patent is extended or adjusted under 35 U.S.C. 154(b) by 804 days.

(21) Appl. No.: 11/167,792

(22) Filed: Jun. 28, 2005

(65) Prior Publication Data
US 2006/0002322 A1    Jan. 5, 2006

(30) Foreign Application Priority Data
Jul. 2, 2004    (EP) ................... 04291696

(51) Int. Cl.
*H04B 7/00*    (2006.01)
(52) U.S. Cl. ...................... 370/230; 370/328
(58) Field of Classification Search .......... 370/230, 370/328, 349, 469, 238, 338, 237, 372, 475; 455/436, 433; 709/224; 707/10
See application file for complete search history.

(56) References Cited

U.S. PATENT DOCUMENTS

| 6,070,184 | A | 5/2000 | Blount et al. | |
|---|---|---|---|---|
| 6,940,832 | B2 * | 9/2005 | Saadawi et al. | ............. 370/328 |
| 7,222,169 | B2 * | 5/2007 | Koshimizu et al. | .......... 709/224 |
| 2002/0039357 | A1 | 4/2002 | Lipasti et al. | |
| 2002/0069278 | A1 | 6/2002 | Forslow | |
| 2002/0073084 | A1 * | 6/2002 | Kauffman et al. | ............. 707/10 |
| 2002/0083145 | A1 | 6/2002 | Perinpanathan | |
| 2002/0094813 | A1 * | 7/2002 | Koshimizu et al. | .......... 455/436 |
| 2003/0161287 | A1 | 8/2003 | Venkitaraman et al. | |
| 2003/0206520 | A1 * | 11/2003 | Wu et al. | ..................... 370/230 |
| 2004/0018839 | A1 * | 1/2004 | Andric et al. | ............... 455/433 |
| 2004/0184450 | A1 * | 9/2004 | Omran | ........................ 370/372 |
| 2005/0135293 | A1 * | 6/2005 | Anttila | ........................ 370/328 |

FOREIGN PATENT DOCUMENTS

| EP | 1 298 878 A1 | 4/2003 |
|---|---|---|
| WO | WO 00/79734 A1 | 12/2000 |
| WO | WO 03/045082 A1 | 5/2003 |

\* cited by examiner

*Primary Examiner*—Kwang B Yao
*Assistant Examiner*—Syed Bokhar
(74) *Attorney, Agent, or Firm*—Sughrue Mion, PLLC

(57) ABSTRACT

The present invention concerns a method for providing multicast services to a group of at least two users belonging to or connectable to a discontinuous coverage network via their respective terminals.

Method characterized in that it comprises at least the two following steps:
during downstream transmission of multicast data, caching or temporarily storing said data or part of said data at at least one adapted point (3) on its transmission path to the group of users (1),
further transmitting downstream at least part of said cached or stored data to at least one user (1) of said group or to a more downstream situated caching or storing point (3) on the concerned transmission path.

12 Claims, 3 Drawing Sheets

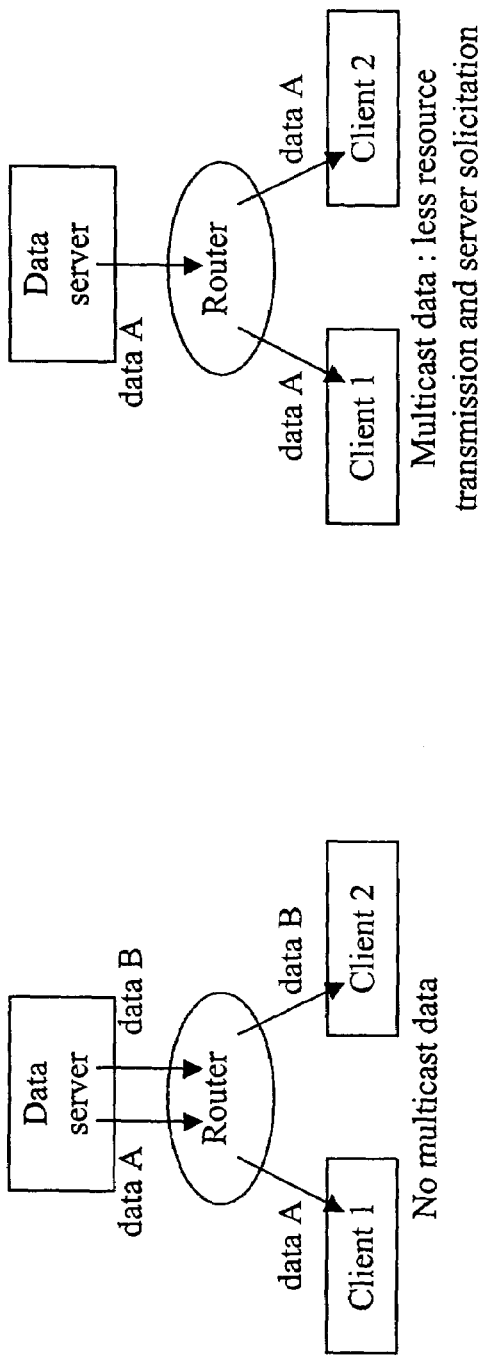
Fig. 1A
Fig. 1B
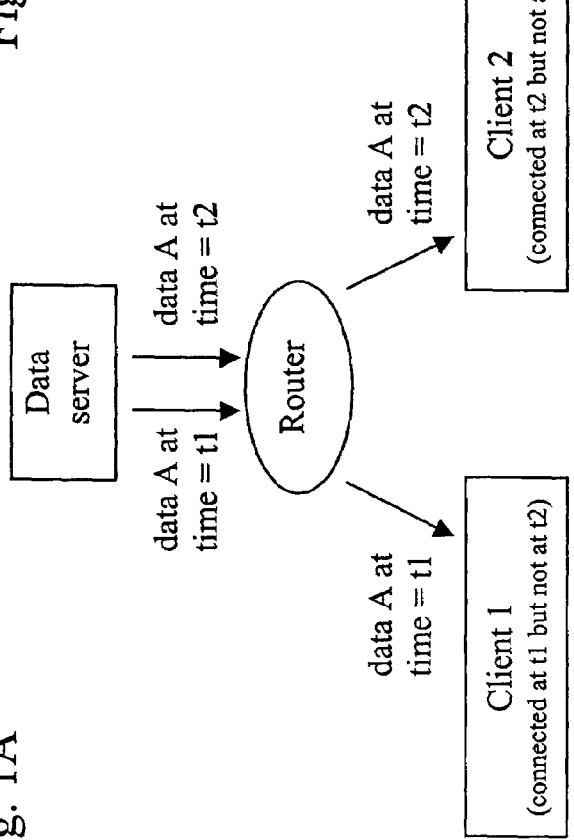
Fig. 2

METHOD TO PROVIDE MULTICAST DATA TRANSMISSION IN A DISCONTINUOUS NETWORK

BACKGROUND OF THE INVENTION

The invention is based on a priority application EP04291696.5 which is hereby incorporated by reference.

The present invention concerns the field of the telecommunications, more particularly in relation to services available through mobile terminals connectable to communication networks.

The present invention concerns more specifically a method and a network allowing to provide multicast data transmission, and associated services, to a user with a mobile terminal, in particular with reduced needs in network resources.

In a discontinuous coverage network (also known as "infostation" system), downstream or downlink data flows (necessary to provide certain services at a mobile terminal) are managed and handled by taking into account the specific nature of the connection.

Thus, when a mobile terminal arrives in a hotspot (area where the radio coverage is available), it retrieves a large amount of data which is necessary for providing the user with the service until said mobile terminal arrives in a new hotspot.

A significant part of the traffic that such a network will support will be of the multicast type. For instance the traffic related to a diffusion of a "multimedia newspaper" everyday towards a group of people who have subscribed for this service, can be considered as a multicast service.

In a network where the final user has continuous connectivity, the multicast nature of the traffic allows to save transmission resources and to reduce the work load of the server by using adequate routing techniques as depicted in the FIGS. 1A and 1B of the drawings.

In a discontinuous coverage network, only a few percentage of the users belonging to a given multicast group are connected (i.e. present in a hotspot or within a coverage area) at the same time.

This discontinuity of the communication link and the resulting random connections of the users of a multicast group, decreases significantly the multicast gain mentioned before.

FIG. 2 of the drawings illustrates this loss of resources' gain in case of two clients or users connected at different times to a data server providing multicast data and services, as it is usual in discontinuous coverage networks.

One understands that, as the two clients are not connected at the same time, the transmission of multicast data consumes almost as much resources (in particular server resources) as the transmission of normal (not multicast) data.

Indeed, despite the multicast nature of the data, the transmission to the clients or users of a concerned multicast group is performed by the server by using as many point to point connections as there are clients.

SUMMARY OF THE INVENTION

It is a main aim of the present invention to overcome the aforesaid drawbacks and restrictions of the prior art.

To this end, the present invention mainly concerns a method for providing multicast services to a group of at least two users belonging to or connectable to a discontinuous coverage network via their respective mobile terminals, characterised in that said method comprises at least the two following steps:

during downstream transmission of multicast data, caching or temporarily storing said data or part of said data at at least one adapted point on its transmission path to the group of users, further transmitting downstream at least part of said cached or stored data to at least one user of said group or to a more downstream situated caching or storing point on the concerned transmission path.

Thus, the main idea of the invention is to implement one or several caches on the downstream or downlink transmission path and to use them to store multicast data in order to transmit it to one, several or all the users or clients of the considered group at randomly distributed time windows depending in particular on the connection opportunities of each user.

The present invention will be better understood thanks to the following description and drawings of embodiments of said invention given as non limitative examples thereof. Among these figures:

BRIEF DESCRIPTION OF THE DRAWINGS

FIGS. 1a and 1b are a schematic depiction of adaptive routing techniques;

FIG. 2 is an illustration of the loss that occurs when two clients connect to a data server at a given time;

DETAILED DESCRIPTION OF THE INVENTION

Figure 3:
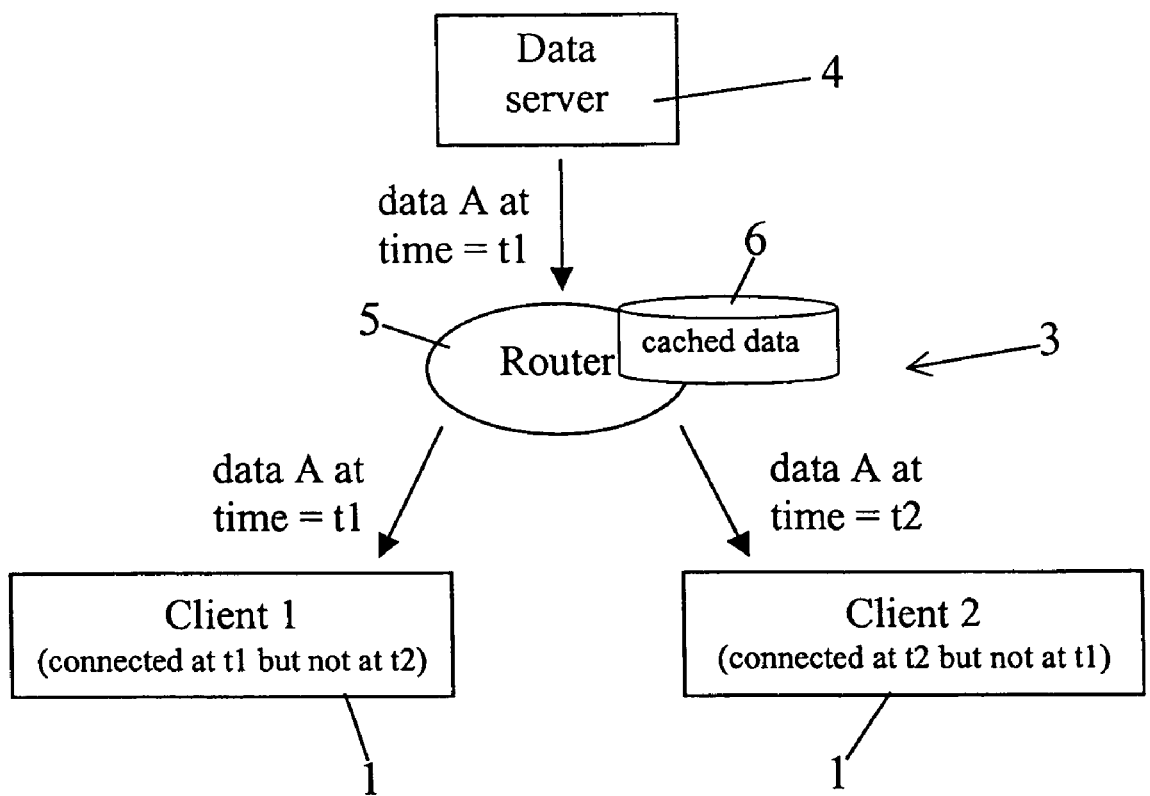
FIG. 3 is a schematical representation of an embodiment of the invention applied to a single case with only two users and a one level network, and, FIG. 4 is a schematical representation of an embodiment of the invention applied to a communication network with several levels and access points.
Figure 4:
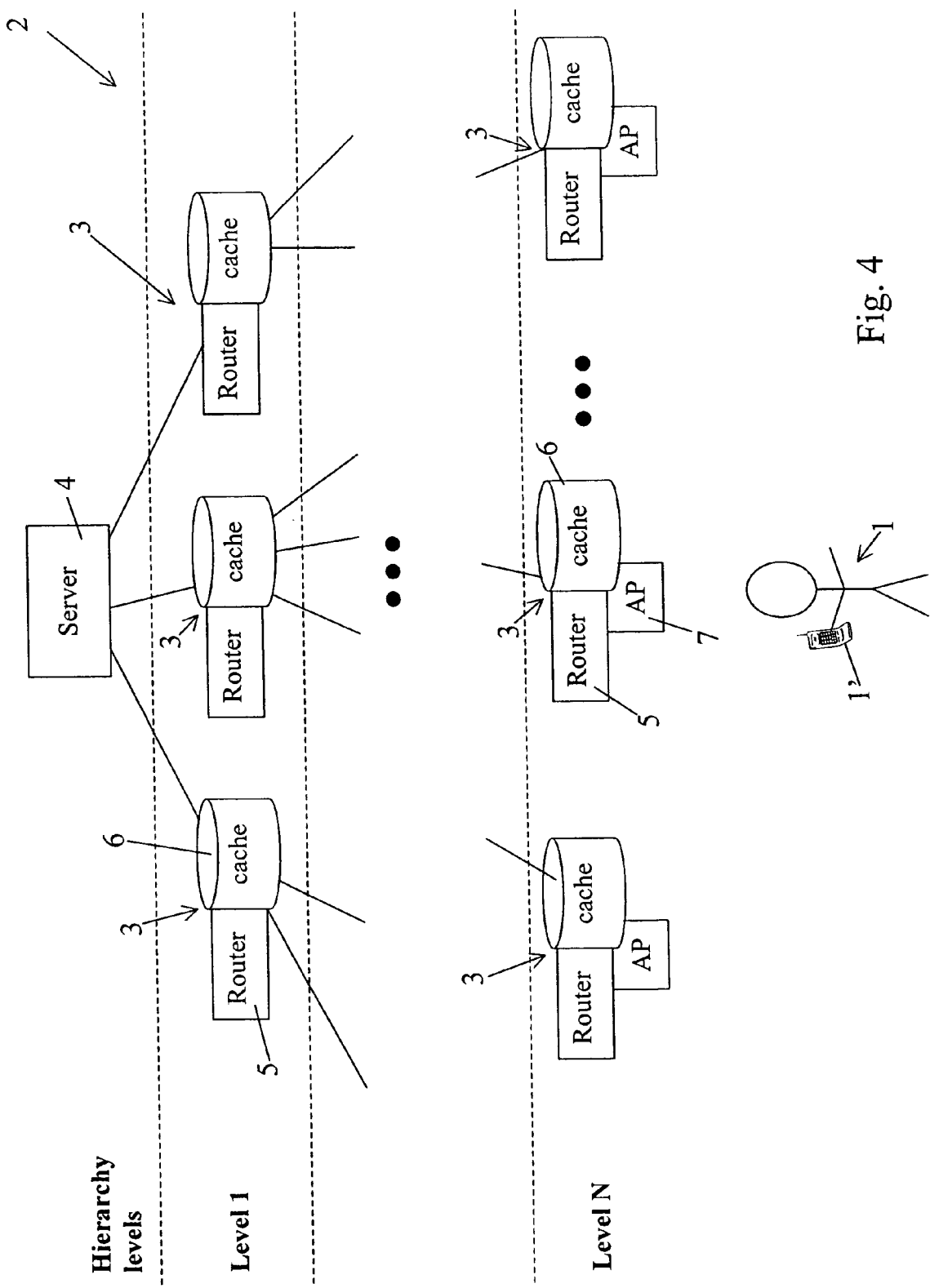

According to the invention, and as shown on FIGS. 3 and 4, the method for providing multicast services to a group of users comprises at least the two following steps:

during downstream transmission of multicast data, caching or temporarily storing said data or part of said data at at least one adapted point 3 on its downlink transmission path to the group of users 1 (first step), further transmitting downstream at least part of said cached or stored data to at least one user 1 of said group or to a caching or storing point 3 situated more downstream on the concerned transmission path (second step).

On the one hand, further downstream transmission or the second step can be performed, possibly repeatedly, automatically upon detection of at least one user 1 of said group located within the coverage area or in a hotspot.

On the other hand, further downstream transmission or the second step can also be performed following a corresponding request by at least one user 1 of said group, said request being sent upstream when said user 1 is within the coverage area or in a hotspot.

Downstream transmission of multicast data is initiated, for example at the server 4 providing the concerned multicast service and data, either automatically or upon acknowledgement of a corresponding request sent by at least one user 1 of the concerned group.

According to an advantageous features of the invention, all the points 3 of the transmission path used for caching at least partly the downstream transmitted multicast data correspond to nodes of the concerned tree shaped network 2 with discontinuous coverage, said nodes 3 being arranged in levels within said tree structure.

In all embodiments of the invention, and despite the fact that not all the users 1 of the concerned group are connected simultaneously (as for example not all users are under coverage during multicast transmission from the server 4), the server and the downlink connection between the server 4 and the node(s) 3 (or between nodes of different levels) are only solicited one time (for each transmission sequence).

Preferably, each node 3 of the network 2 also comprises, in addition to a router 5, a cache or a similar storage means 6, the nodes 3 of the most downlink level of the network 2 being associated with access point means 7 for the terminals 1' of the users 1 of said network 2 (FIGS. 3 and 4).

In order to avoid wasting storage resources for worthless data or fleeting data, a selection can be performed among the transmitted data in order to decide at each node if a caching operation should be executed or not.

Thus, the caching or storing of a piece of multicast data at an adapted point or node 3 of the downstream transmission path is decided for this point 3 based on one or several criteria of the following group of criteria comprising:
the lifetime of the considered piece of data,
the number of users 1 in the concerned multicast group,
the amount of storing resources needed for the considered piece of data,
the importance of the piece of data,
the situation of the point 3 in the network 2,
the number of users 1 having requested said piece of data,
the data storage costs,
the local time in the coverage area of the network 2,
the probability that (a) user(s) wishing to retrieve this piece of data get(s) connected under a considered node 3 before data lifetime expiration, said criteria being possibly weighted criteria.

Furthermore, in order to use the available storage capacity efficiently, the method according to the invention can also allow that each node 3 of the network caching a piece of data provides information about this operation to another node 3 situated upstream of it and connected to it and that the other node 3 of the network 2 erases a stored piece of data when said piece of data is stored at all nodes 3 situated downstream of it and connected to it The method according to the invention will now be described in more details in connection with a multileveled network 2 (N levels) as shown on FIG. 4, which generalises the use of caches 6 for transporting multicast downstream traffic in a discontinuous coverage network 2.

In the tree shaped topology of the network 2, caches 6 can be envisioned at each node 3 of the tree.

When a client or user 1 of a multicast group gets connected and retrieves a piece of data, the data crosses a set of caches along its path from the server 4 to access point 6 defining a hotspot of the coverage area.

An issue is to decide whether it is worth to cache this data anywhere along the path, and if so, at which level(s) of the hierarchy.

The following simple algorithm can be envisioned which allows each router 5 to decide whether it shall cache a certain piece of data or not before forwarding it.

It is assumed that a header associated with the piece of data includes information about:
the number of users 1 within the multicast group
the lifetime of the data (after this duration, no user of the multicast group will expect this piece of data anymore and/or the data itself will be obsolete).

It is also assumed that each router 5 knows the number of access points 7 which are attached to it.

According to these information, the router 5 computes the probability that caching the data will serve (i.e. the probability that an other user 1 who needs this piece of data will get connected thanks to one of the access points 7 attached to it). Depending whether this probability is above a certain threshold or not, the router 5 will cache the data or not. Eventually, this probability can be balanced by the cost for the router to cache the covered piece of data.

Hence, the more a data is intended to be sent to a large amount of users 1 and the more this data has a long lifetime, the more this data will be cached at different nodes 3 on the downstream of the network 2.

As a further feature, one can added the following rule: when a "son router" has decided to cache a piece of data, then it tells it to its "father router". As it is useless that a "father router" caches a data which is also cached by all its "sons routers", the "father router" can take such information into consideration for further caching decisions.

It should be noticed that cache resources with associated cache hierarchy is nowadays widely spread over the IP networks. Nevertheless, using such cache resources as described herein has not yet been contemplated in the prior art, in particular not in relation to multicast traffic and to temporary connectivity due to the mobility of the user (in the present specification user should be understood as being a user 1 having a while terminal 1').

The inventive solution allows to take advantage of the multicast nature of the data, to save network resources in a discontinuous coverage network, as it is done in permanent connectivity networks, thanks to multicast routing techniques.

The present invention also encompasses a communication network with discontinuous coverage providing multicast services to at least one group of at least two users belonging to or connectable to said network, characterised in that said network 2 comprises nodes 3 acting as caching or storing points and able to perform the method as described before.

According to the invention, there is also proposed a router arrangement adapted to form a node for a communication network of the type mentioned before, characterised in that said arrangement comprises, in addition to the router 5 itself, also a cache or similar storage means 6 and in that said arrangement is able to perform the method described previously.

The present invention is, of course, not limited to the preferred embodiments described and represented herein, changes can be made or equivalent used without departing from the scope of the invention.

The invention claimed is:

1. A method for providing multicast data to a group of at least two users belonging to or connectable to a discontinuous coverage network via respective terminals of the users, wherein said method comprising:
transmitting downstream the multicast data directed to the group of the at least two users;
during the transmitting downstream the multicast data, caching selectively the multicast data or part of the multicast data at first at least one caching point on a transmission path to the group of the at least two users, the first at least one caching point being disposed upstream the terminals of the users,
further transmitting downstream at least part of the multicast data or part of the multicast data cached at the first at least one caching point to at least one user of the group or, for caching, to second at least one caching point on the transmission path, the second at least one caching point being disposed upstream the terminals of the users, wherein, for the selectively caching at the first at least one caching point, whether to cache the multicast data or part of the multicast data is determined according to at least one criterion, and wherein the multicast data or part of the multicast data is cached only once at the first at least one caching point, or the at least part of the multicast data or part of the multicast data that is transmitted to the second at least one caching point is cached only once at the second at least one caching point.

2. The method according to claim 1, wherein the further transmitting downstream the at least part of the multicast data or part of the multicast data cached at the first at least one caching point is performed repeatedly, automatically upon detection of at least one user of the group located within a coverage area of the discontinuous coverage network.

3. The method according to claim 1, wherein the further transmitting downstream the at least part of the multicast data or part of the multicast data cached at the first at least one caching point is performed following a corresponding request by at least one user of the group, the corresponding request being sent upstream when the at least one user of the group is within a coverage area of the discontinuous coverage network.

4. The method according to anyone of claim 1, wherein the transmitting downstream the multicast data directed to the group of the at least two users is initiated at a server providing the multicast data, either automatically or upon acknowledgement of a corresponding request sent by at least one user of the group.

5. The method according to claim 1, wherein the first and second at least one caching points correspond to nodes of the discontinuous coverage network with a tree structure, the nodes being arranged in levels within the tree shape structure.

6. The method according to claim 1, wherein at least one of the first and second at least one caching points comprise a router, a cache or storage means, wherein the discontinuous coverage network comprise a plurality of caching points including the first and second at least one caching points disposed downstream of a server initially generating the multicast data, the plurality of caching points caching the multicast data or part of the multicast data, and wherein a most downstream-disposed caching point of the discontinuous coverage network being associated with access point means serving the respective terminals of the at least two users of the group.

7. The method according to claim 1, wherein the at least one criterion comprises:
a lifetime of the transmitted multicast data or part of the multicast data;
a number of the at least two users in the group,
an amount of storing resources for caching the transmitted multicast data or part of the multicast data at the first and second at least one caching points;
an importance of the transmitted multicast data or part of the multicast data;
a situation of the first and second at least one caching points;
a number of the at least two users having requested the multicast data or part of the multicast data;
costs for caching the multicast data or part of the multicast data at the at least one of the first and second at least one caching points;
a local time in a coverage area of the discontinuous coverage network when at least one user of the group is in the coverage area;
a probability that the at least two users wishing to retrieve the multicast data or part of the multicast data get connected to the at least one of the first and second at least one caching points within a lifetime of the multicast data or part of the multicast data,
wherein the at least one criterion being possibly weighted with respect to one another.

8. The method according to claim 1, wherein if the second at least one caching point performs caching the at least part of the multicast data or part of the multicast data cached at the first at least one caching point, the second at least one caching point provides information about an operation of the performed caching to the first at least one caching point,
wherein, based on the information, the first at least one caching point erases the at least part of the multicast data or part of the multicast data that has been transmitted to the second at least one caching point if the at least part of the multicast data or part of the multicast data is stored at all caching points including the second at least one caching point situated downstream of and connected to the first at least one caching point.

9. A communication network with a plurality of discontinuous coverage areas providing multicast data to a group of at least two users belonging to or connectable to the communication network,
wherein the communication network comprises nodes that performs the first and second at least one caching points, respectively, and perform the method according to claim 1.

10. A router arrangement adapted to form the first at least one caching point or the second at least one caching point for a communication network with discontinuous coverage areas providing multicast data to a group of at least two users belonging to or connectable to the communication network, wherein the router arrangement comprises a router, a cache or similar storage means,
wherein the router arrangement performs the method according to claim 1.

11. The method according to claim 1, wherein if the second at least one caching point performs caching the at least part of the multicast data or part of the multicast data cached at the first at least one caching point, the at least one criterion is included in a header associated with a piece of the at least part of the multicast data or part of the multicast data.

12. The method according to claim 6, wherein the first at least one caching point comprises a nearest downstream-disposed caching point from the server.

* * * * *